Dec. 23, 1947.　　　J. P. HAMILTON　　　2,433,045
RECOVERY OF POLYMERIZED OLEFINES
Filed Sept. 24, 1943
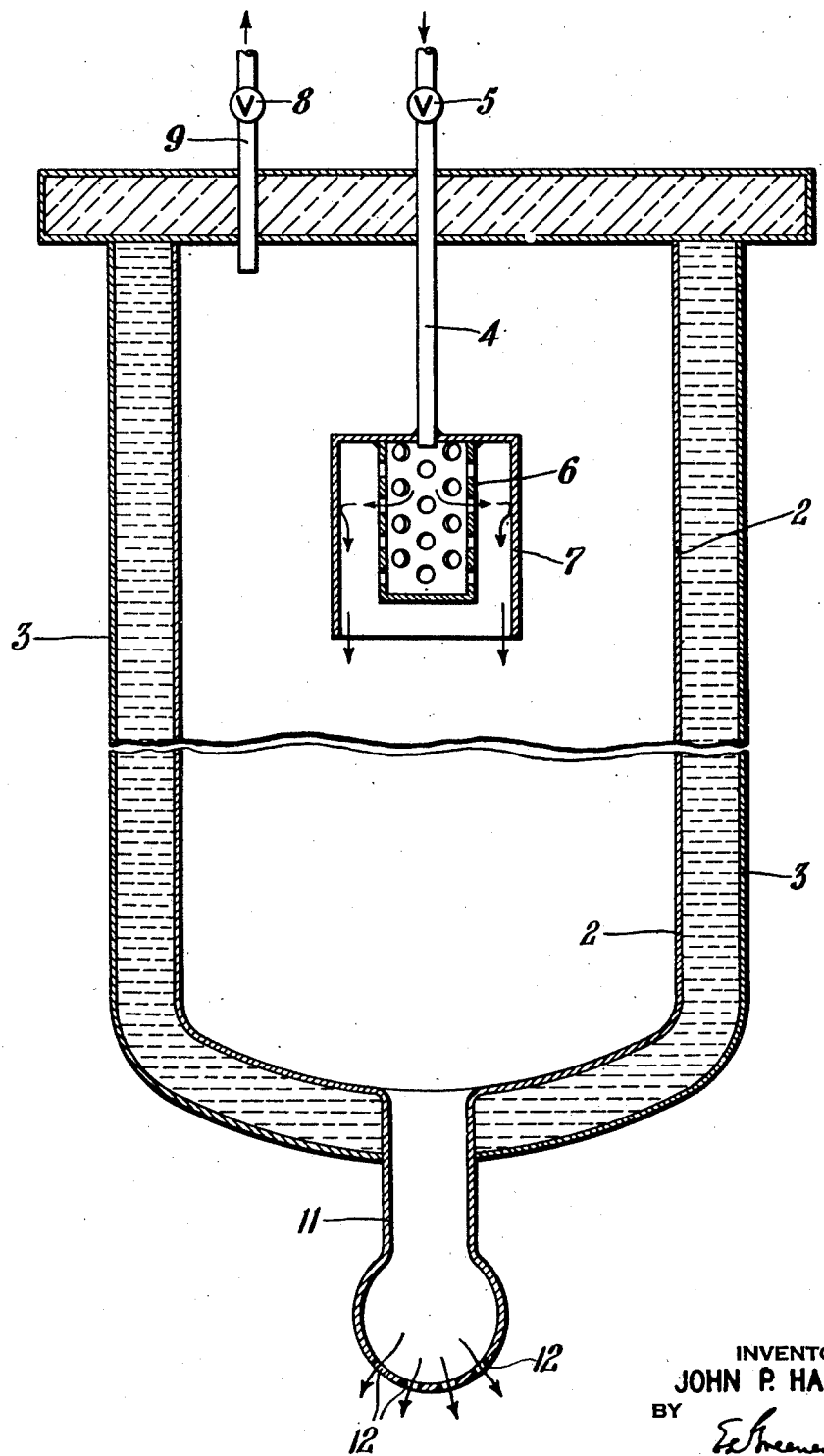
INVENTOR
JOHN P. HAMILTON
BY
ATTORNEY Patented Dec. 23, 1947

2,433,045

UNITED STATES PATENT OFFICE 2,433,045

RECOVERY OF POLYMERIZED OLEFINES

John P. Hamilton, Buffalo, N. Y., assignor to Carbide and Carbon Chemicals Corporation, a corporation of New York Application September 24, 1943, Serial No. 503,643

3 Claims. (Cl. 18—47.5)

1

The invention relates to olefine polymerization, and particularly to an improved method for recovering and collecting solid polymers formed by gas-phase polymerization of olefines. More specifically, it is concerned with a new process for collecting solid polyethylene directly as produced in a high pressure reaction zone.

Solid and semi-solid polymers of olefines have been made by subjecting such compounds in the gaseous state to high pressures and temperatures. Typical of these products is solid polyethylene, a tough resinous substance, which can be produced by subjecting ethylene to temperatures above 100° C. while applying pressures in excess of 500 atmospheres. A rapid and continuous polymerization has been found preferable for large quantity production of this resin, and in such operation the polymer may be recovered from the reaction zone by discharging it with the unreacted ethylene gas through a pressure release valve, and collecting the polyethylene in a filter or gravity settling chamber. The product so obtained, if rapid cooling accompanies the release of the pressure, is of small particle size and low bulk density, and is referred to as polyethylene "snow." Maintaining cleanliness and purity in this form of the resin requires considerable care; and for subsequent working, by the ways usually applied to plastic materials, preliminary processing to a more compact state is generally desirable. Considerable handling of the resin before final fabrication is thus often necessary, and this contributes a further problem in sustaining purity of the product.

It is an object of this invention to provide an improved method for recovering solid olefine polymers made by high pressure gas-phase reactions, which give a dense, compact product more easy to handle, and much more adaptable to subsequent processing. A further object is to accomplish this end as a part of the high pressure polymerization process, whereby there is insured an initial high purity in the resin product which purity can be readily maintained during fabrication into useful articles.

In accordance with the invention I propose to collect solid polyolefines in extruded form by a process continuous with the polymerization, and by utilizing the temperature and pressure of the gas leaving the reactor for effecting the extrusion. This is accomplished by releasing the unreacted olefine gas, in which the polymerized product is entrained, from the high pressure reaction zone directly into a collection vessel of dimensions sufficient to permit substantial gas

2 expansion and separation of the polymer from the gas. The temperature of the released gas is maintained at a point which will keep the resin in a plastic state, and the pressure is controlled within a range sufficient to extrude the resin through suitable dies into rods, filaments or other forms. The cooled and hardened extruded material can then be comminuted as desired to provide a physical form of the resin suitable to conventional fabrication with a minimum of further handling.

The accompanying diagrammatic drawing is further illustrative of the invention, and shows an apparatus suitable for applying the process to the recovery of solid polyethylene.

In the drawing a hot-pot or collection vessel 2 is surrounded by a heat-retaining or fluid-heating jacket 3, and the vessel is mounted contiguous with the high pressure reactor. A pipe 4 of small diameter connects with the reactor through a release and pressure expansion valve 5 and serves to deliver polyethylene and unreacted gas directly into the collection vessel. A larger perforated pipe 6 is attached to the end of pipe 4, and is surrounded by a shield 7. Another pressure release valve 8 and associated pipe 9 serve to control the internal pressure of the collection vessel, and to provide a discharge port for the unreacted ethylene gas. A neck 11 at the bottom of the vessel 2 has a slightly expanded end portion carrying a number of small holes 12, and this constitutes an extrusion nozzle for the resin.

In a typical operation the ethylene polymerization reactor is held at a temperature of 200° C. to 300° C. and at a pressure in the neighborhood of 20,000 to 35,000 pounds per square inch. The unreacted ethylene, which in a rapid reaction usually amounts to 80% or more of the gas introduced to the polymerization zone, is exhausted continuously, or intermittently, through the expansion valve 5, and passes with the polymerized product into the collector. The polyethylene is ejected through the perforated pipe 6 against the shield 7, and the semi-fluid polymer drains from the walls of the shield and settles to the bottom of the collector vessel. The shield functions primarily to prevent the resin from channeling by building up on the walls of the collector. The heat in the expanded ethylene gas is normally sufficient to keep the resin in an extrudable plastic condition, and with the aid of a high temperature heat transfer fluid in the jacket about the collector, a substantially constant temperature suitable for extrusion is maintained. Continuous extrusion of polyethylene has been accomplished at a temperature of about 250° C., and at a pressure of about 500 pounds per square inch, said pressure also being furnished by the ethylene discharged from the reactor, and being controlled as desired by means of the release valve 8. With the nozzle here shown the resin extrudes in filament form resembling "spaghetti". Unreacted ethylene as it separates from the plastic polymer is discharged through valve 8, and can be recycled to the polymerization zone.

As indicated a preferred embodiment of the invention pertains to the recovery of ethylene polymers, but within the broader scope of the disclosure application of the process to the collection of other solid polymers from gaseous olefines is contemplated, including both single polymers and co-polymer products. Actual extrusion conditions may be modified to suit specific resin characteristics, and to correlate the rate of recovery with the speed of production, but for most purposes a temperature in the collection vessel of from 125° C. to 300° C., with a pressure of from 100 to 1000 pounds per square inch, will give a satisfactory resin recovery.

Many types of apparatus are suitable for practicing the invention, and no limitations in this respect are intended.

I claim:

1. In a continuous gas-phase polymerization of olefines to solid polymers under pressures exceeding 500 atmospheres and at temperatures above 100° C., a process for collecting the polymerized product which comprises discharging the unreacted gas and polymer directly from the reaction zone into a vessel closed to the atmosphere when charged with polymer and adapted to permit separation of the gas from the polymer and a gas expansion to a pressure of from 100 to 1000 pounds per square inch, keeping the polymerized product in said vessel in a plastic state by maintaining a temperature in the gas of from 125° C. to 300° C., and continuously extruding the polymer under pressure of said unreacted gas into a dense compact product resistant to deterioration on subsequent handling and fabrication.

2. In a continuous gas-phase polymerization of ethylene to solid polymers under pressures exceeding 500 atmospheres and at temperatures above 100° C., a process for collecting the solid polyethylene which comprises discharging the unreacted ethylene and polymer directly from the reaction zone into a vessel closed to the atmosphere when charged with polymer and adapted to permit separation of the gas from the polymer and a gas expansion to a pressure of from 100 to 1000 pounds per square inch, maintaining a temperature in the gas of from 125° C. to 300° C. to keep the polyethylene in said vessel in a plastic state, and continuously extruding the polyethylene under pressure of said unreacted ethylene gas into a dense compact product resistant to deterioration on subsequent handling and fabrication.

3. In a continuous gas-phase ploymerization of ethylene to solid polymers under pressures exceeding 500 atmospheres and at temperatures above 100° C., a process for collecting the solid polyethylene which comprises discharging the unreacted ethylene and polymer directly from the reaction zone into a vessel closed to the atmosphere when charged with polymer and adapted to permit separation of the gas from the polymer and a gas expansion to a pressure of about 500 pounds per square inch, keeping the polyethylene in a plastic state by maintaining a temperature in the gas of about 250° C., and continuously extruding the polyethylene under pressure of said unreacted ethylene gas into a dense compact product resistant to deterioration on subsequent handling and fabrication.

JOHN P. HAMILTON.

REFERENCES CITED

The following references are of record in the file of this patent:

UNITED STATES PATENTS

| Number | Name | Date |
| --- | --- | --- |
| 2,077,542 | Wulff et al. | Apr. 20, 1937 |
| 2,226,529 | Austin | Dec. 31, 1940 |
| 2,210,774 | Perrin et al. | Aug. 6, 1940 |
| 2,221,000 | Kuentzel et al. | Nov. 12, 1940 |
| 2,256,483 | Johnson | Sept. 23, 1941 |
| 2,149,562 | Velde et al. | Mar. 7, 1939 |
| 2,388,138 | Greenewalt | Oct. 30, 1945 |